United States Patent
Ozono et al.

(10) Patent No.: US 11,724,383 B2
(45) Date of Patent: Aug. 15, 2023

(54) ROBOT

(71) Applicant: KABUSHIKI KAISHA YASKAWA DENKI, Kitakyushu (JP)

(72) Inventors: Ryo Ozono, Fukuoka (JP); Masaki Ozawa, Fukuoka (JP); Go Yamaguchi, Fukuoka (JP)

(*) Notice: Subject to any disclaimer, the term of this patent is extended or adjusted under 35 U.S.C. 154(b) by 93 days.

(21) Appl. No.: 17/216,685

(22) Filed: Mar. 30, 2021

(65) Prior Publication Data

US 2021/0308859 A1    Oct. 7, 2021

(30) Foreign Application Priority Data

Apr. 2, 2020  (JP) ................................. 2020-066844

(51) Int. Cl.
| | | |
|---|---|---|
| B25J 11/00 | (2006.01) | |
| B25J 9/00 | (2006.01) | |
| B25J 9/04 | (2006.01) | |
| B25J 18/04 | (2006.01) | |

(52) U.S. Cl.
CPC ............. *B25J 9/0009* (2013.01); *B25J 9/042* (2013.01); *B25J 18/04* (2013.01)

(58) Field of Classification Search
CPC ................................ B25J 9/0009; B25J 18/04
See application file for complete search history.

(56) References Cited

U.S. PATENT DOCUMENTS

| | | | |
|---|---|---|---|
| 6,731,091 B2 * | 5/2004 | Hietmann | B25J 19/0054 318/641 |
| 2013/0061707 A1 * | 3/2013 | Long | B25J 19/0016 74/490.01 |
| 2014/0283642 A1 | 9/2014 | Harada et al. | |
| 2019/0099881 A1 | 4/2019 | Niu | |
| 2019/0099900 A1 | 4/2019 | Niu et al. | |
| 2019/0126466 A1 * | 5/2019 | Owa | B25J 9/04 |
| 2019/0344454 A1 | 11/2019 | Nakayama | |

FOREIGN PATENT DOCUMENTS

| | | | | |
|---|---|---|---|---|
| CN | 104858892 | | 3/2017 | |
| CN | 208759606 | | 4/2019 | |
| CN | 208759606 U | * | 4/2019 | ............. B25J 17/00 |

(Continued)

OTHER PUBLICATIONS

Office Action issued in Japanese Patent Application No. P2020-066844, dated Aug. 18, 2020 (with English partial translation).

(Continued)

*Primary Examiner* — Randell J Krug
(74) *Attorney, Agent, or Firm* — Soei Patent & Law Firm

(57) ABSTRACT

A robot includes an articulated arm; and a base unit to which the articulated arm is operably coupled. The base unit includes: a rotating portion; an actuator mounted on the rotating portion and configured to rotate the rotating portion about a first axis; an arm connector attached to a first portion of the rotating portion. The articulated arm is connected to the arm connector to swing about a second axis; and a rib straddling the actuator and connecting the arm connector to a second portion of the rotating portion. The actuator is located between the first portion and the second portion of the rotating portion.

20 Claims, 19 Drawing Sheets

(56) References Cited

FOREIGN PATENT DOCUMENTS

| | | |
|---|---|---|
| DE | 202004012584 | 1/2005 |
| DE | 102017115442 | 1/2019 |
| EP | 2100699 A1 * | 9/2009 .............. B25J 15/00 |
| EP | 2100699 | 1/2019 |
| JP | 2010-179386 | 8/2010 |
| JP | 5729410 | 6/2015 |
| JP | 2019-063935 | 4/2019 |
| JP | 2019-063940 | 4/2019 |
| JP | 2019-195874 | 11/2019 |
| WO | 2020/031289 | 2/2020 |

OTHER PUBLICATIONS

Extended Search Report in corresponding European Application No. 21163748.3, dated Sep. 7, 2021.

* cited by examiner

ROBOT

CROSS-REFERENCE TO RELATED APPLICATION

This application is based upon and claims the benefit of priority from Japanese Patent Application No. 2020-066844, filed on Apr. 2, 2020, the entire contents of which are incorporated herein by reference.

BACKGROUND

Field

The present disclosure relates to a robot.

Description of the Related Art

Japanese Patent No. 5729410 discloses a robot including a link portion whose base end side in the longitudinal direction is rotatably coupled to a predetermined member. The link part is manufactured from a welded steel pipe and formed into a cylindrical shape, and a cross-sectional shape in a direction perpendicular to the longitudinal direction is an elliptical shape or a shape in which at least one of corners of a rectangular shape are curved. The welded portion of the welded steel pipe is formed at a portion having a small stress set based on a stress distribution indicating the magnitude of the stress of the link portion.

SUMMARY

Disclosed here in is a robot. The robot may include: an articulated arm, and a base unit. The base unit may include: a rotating portion, an actuator mounted on the rotating portion and configured to rotate the rotating portion about a first axis, and an arm connector provided on a first portion of the rotating portion away from the actuator. The articulated arm may be connected to the arm connector to swing about a second axis. The base unit may further include a rib straddling the actuator and connecting the arm connector to a second portion of the rotating portion. The actuator may be located between the first portion and the second portion of the rotating portion.

DETAILED DESCRIPTION

Figure 1:
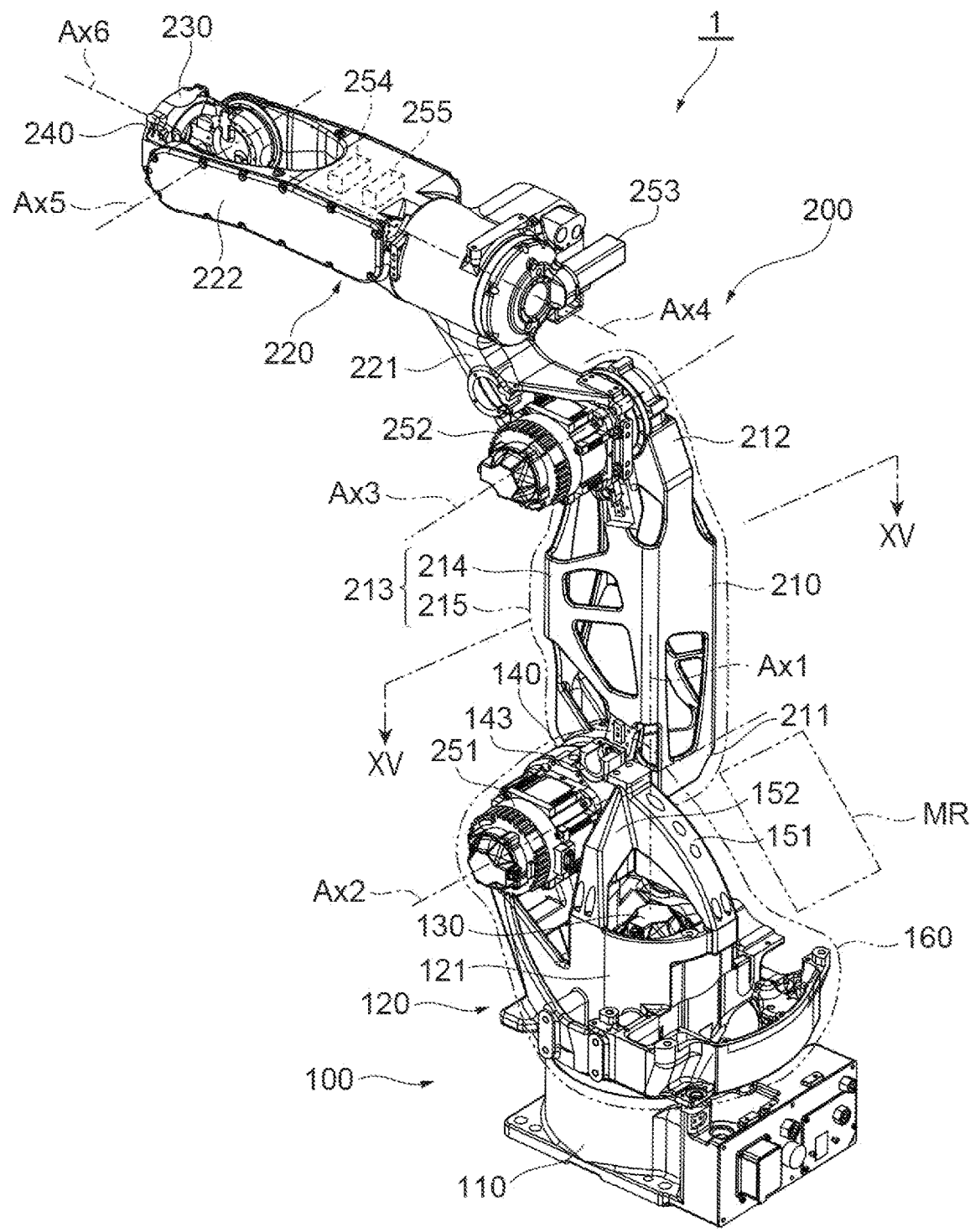
FIG. 1 is a perspective view of a robot.

Hereinafter, with reference to the drawings, the same elements or similar elements having the same function are denoted by the same reference numerals, and redundant description will be omitted.

Robot

A robot 1 shown in FIG. 1 is a so-called a vertical articulated robot, which automatically performs various operations on a work object. The robot 1 may be, for example, an industrial robot that automatically performs various kinds of transportation, processing, assembly, and the like on a part, an assembly, or the like in a production line of a product. However, the use of the robot 1 is not limited to industrial use. The robot 1 comprises a base unit 100 and an articulated arm 200.

The base unit 100 includes a base 110, a rotating unit 120, and an actuator 130. The base 110 is fixed to a floor surface or the like of the work area. The base 110 may be fixed on a moving body such as an automated guided vehicle (AGV). The rotating unit 120 is attached to the base 110 to rotate about an axis Ax1 (first axis).

In the following description of the structure of the robot 1, "upper" and "lower" are used to indicate the arrangement relationship. The "upper" and "lower" mean "upper" and "lower" in a state where the axis Ax1 is vertical and the rotating unit 120 is positioned above the base 110, but the base unit 100 does not necessarily have to be arranged in this manner. For example, the base unit 100 may be arranged such that the rotating unit 120 is located below the base 110, or the rotating unit 120 is located at a side of the base 110. For example, the base 110 may be fixed to a ceiling surface of the work area, or the base 110 may be fixed to a wall surface of the work area.

The actuator 130 includes a motor and a speed reducer, and rotates the rotating unit 120 around the axis Ax1.

As shown in FIG. 1, the articulated arm 200 is of the serial link type and has arms 210, 220, and 230, a tool attachment portion 240, and actuators 251, 252, 253, 254, and 255.

The articulated arm 200 is operably coupled to the base unit 100. In an example, an arm 210 (first arm) is coupled to the rotating unit 120 and swings about an axis Ax2 (second axis) passing through the coupling portion of the arm 210 and the rotating unit 120. The axis Ax2 may cross (e.g., cross orthogonally) the axis Ax1. Here, "cross" includes a relationship of skew lines such as a so-called three-dimensional crossing. The same applies to the following description.

An arm 220 (second arm) is coupled to a tip portion of the arm 210 and swings about an axis Ax3 (third axis) through a coupling portion of the arm 220 and the arm 210. The axis Ax3 may be parallel to the axis Ax2.

The arm 220 has an arm base 221 and a rotating arm 222. The arm base 221 is coupled to a tip portion of the arm 210 and swings around the axis Ax3. The rotating arm 222 is coupled to a tip portion of the arm base 221 and extends from the arm base 221 along an axis Ax4 that crosses (e.g., cross orthogonally) the axis Ax3 and rotates about the axis Ax4.

An arm 230 is coupled to a tip portion of the arm 220 and rotates about an axis Ax4 along the arm 220 and swings about an axis Ax5 that crosses (e.g., cross orthogonally) the axis Ax4. For example, the arm 230 is coupled to a tip portion of the rotating arm 222 and swings about the axis Ax5 through a coupling portion of the arm 230 and the rotating arm 222.

The tool attachment portion 240 is provided at a tip portion of the arm 230. A tool (not shown) for work is attached to the tool attachment portion 240. The tool attachment portion 240 rotates about an axis Ax6 along the arm 230 across the axis Ax5. Examples of the tool include a suction nozzle for sucking a workpiece, a hand for gripping a workpiece, a welding torch, a screw fastening tool (for example, an electric driver), and a polishing tool (for example, a grinder).

Each of the actuators 251, 252, 253, 254, and 255 includes, for example, a motor and a speed reducer, similar to the actuator 130, to drive the articulated arm 200. For example, the actuator 251 swings the arm 210 about the axis Ax2, the actuator 252 swings the arm 220 about the axis Ax3, the actuator 253 rotates the arm 230 about the axis Ax4, the actuator 254 swings the arm 230 about the axis Ax5, and the actuator 255 rotates the tool attachment portion 240 about the axis Ax6.

Rotating Portion

Next, the structure of the rotating unit 120 will be described in more detail. The rotating unit 120 has a rotating base 121 (rotating portion), an arm connector 140, and a rib 151. The rotating base 121 is made of, for example, a metal material, and is mounted on the base 110 via the actuator 130 so as to rotate around the axis Ax1.

Figure 2:
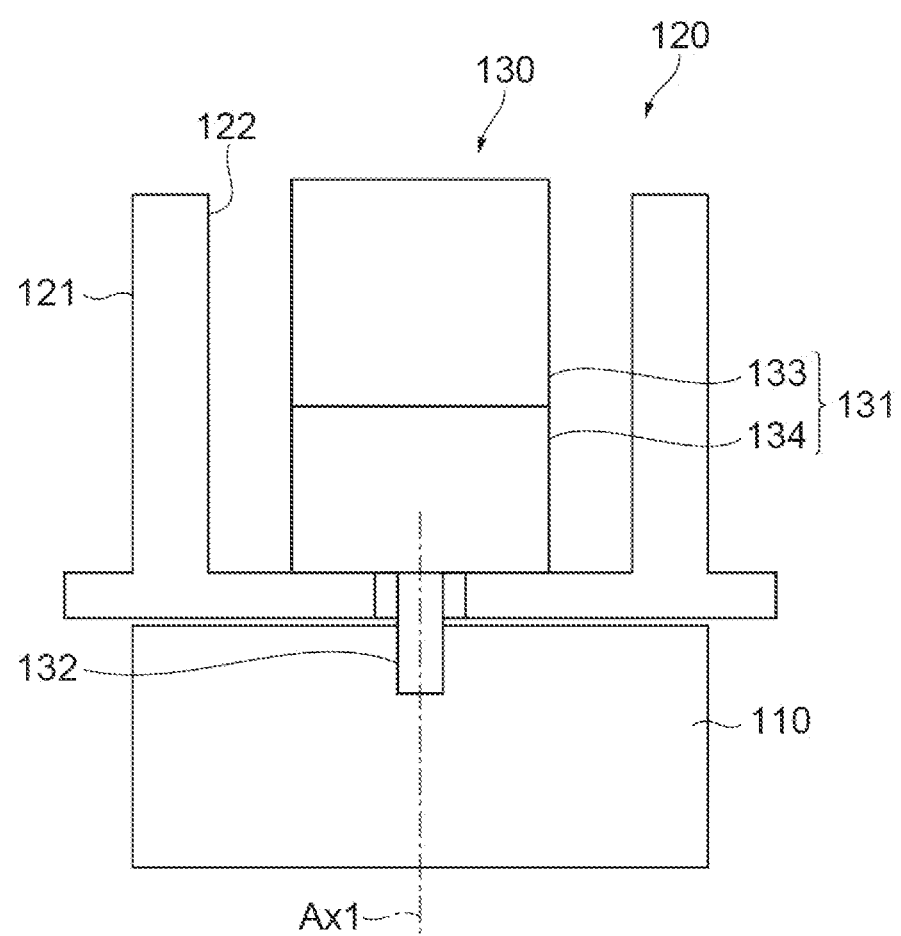
FIG. 2 is a schematic view illustrating the structure of the connection portion between a rotating base and a base.

As shown in FIG. 2, the actuator 130 has a body 131 and an output shaft 132. The output shaft 132 protrudes from the body 131 and the actuator 130 rotates the output shaft 132 relative to the body 131. The body 131 comprises a motor 133 of the rotary type and a speed reducer 134. The speed reducer 134 (or a transmitter) reduces the rotation speed of the motor 133 and transmits it to the output shaft 132.

The actuator 130 is provided in (or mounted on) the rotating unit 120. That the actuator 130 is provided in the rotating unit 120 means that the body 131 is attached to the rotating unit 120. For example, the body 131 is attached to the rotating unit 120 with the output shaft 132 facing vertically downward along the axis Ax1. The output shaft 132 passes through the rotating unit 120 and is attached to the base 110.

In the example of FIG. 2, the body 131 is disposed directly above the output shaft 132, but is not necessarily limited thereto. For example, the body 131 may be attached to the rotating base 121 at an eccentric position with respect to the output shaft 132 (with respect to the axis Ax1) (see FIG. 3).

As shown in FIGS. 1 and 2, the rotating base 121 may have an actuator housing 122 that opens upward to receive the actuator 130. The body 131 is accommodated within the actuator housing 122 and is fixed to the bottom of the actuator housing 122.

Figure 4:
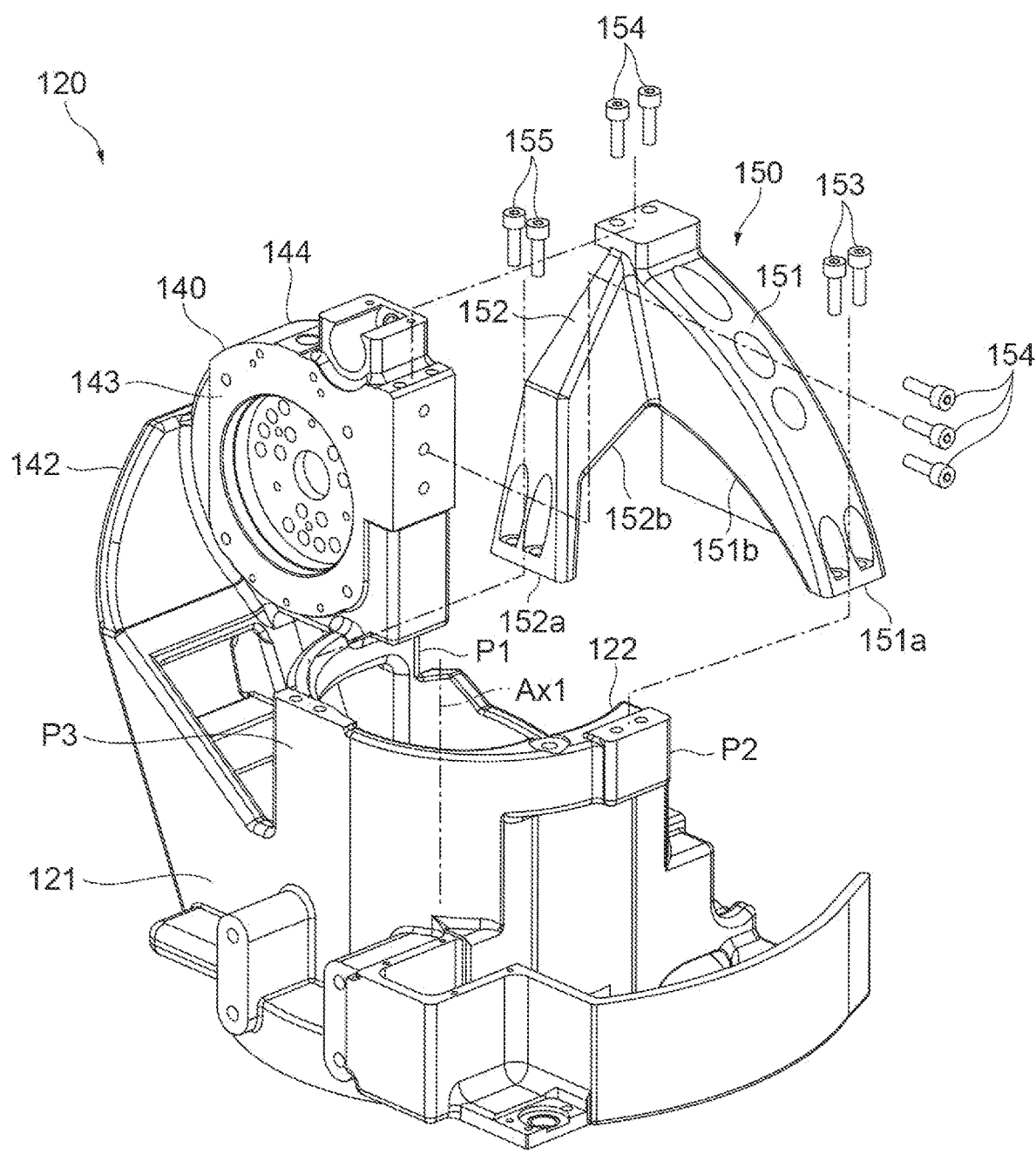
FIG. 4 is a perspective view illustrating a state in which a rib of a base unit is removed.
Figure 5:
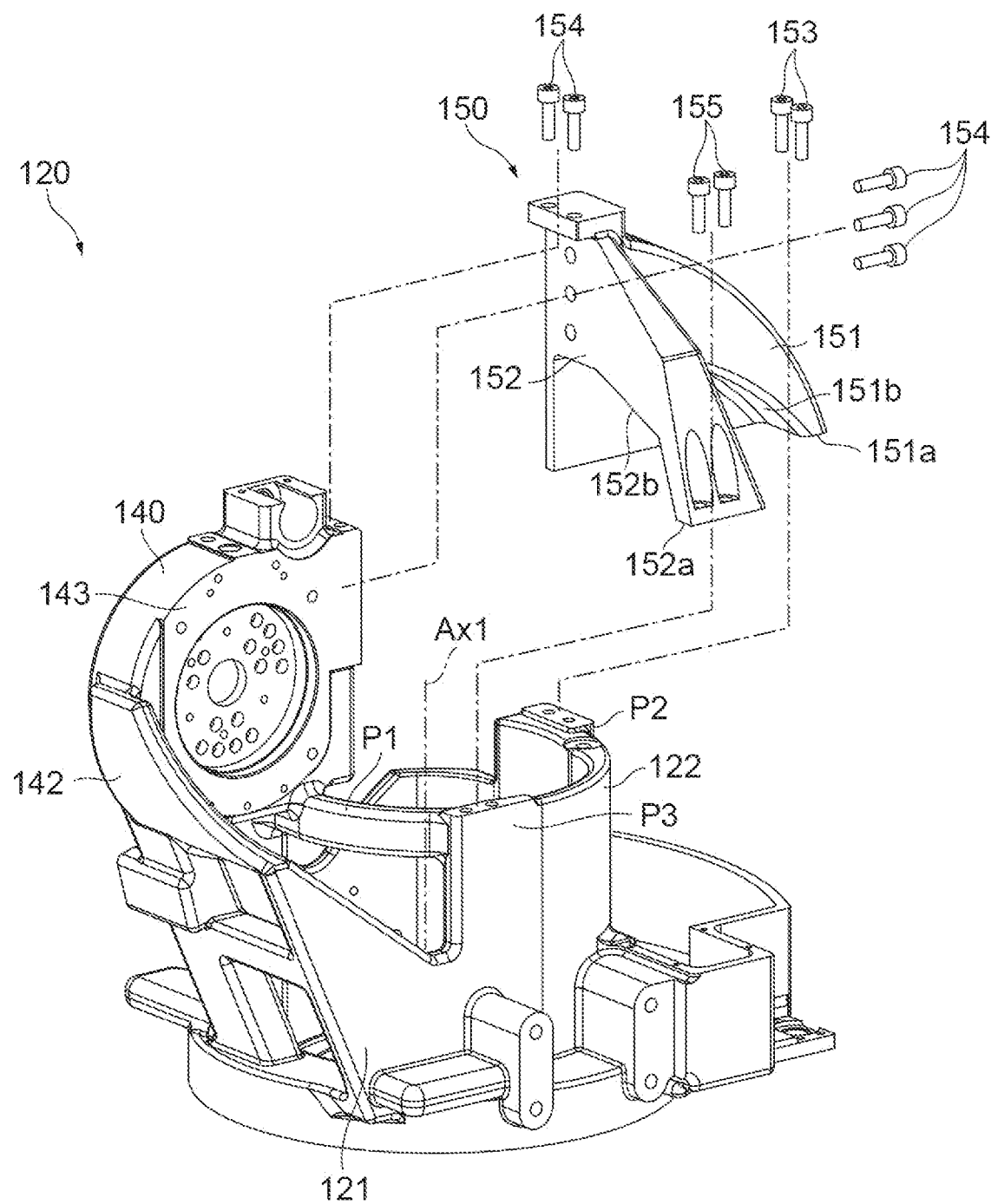
FIG. 5 is a perspective view illustrating a state in which the rib of the base unit is removed from a direction different from FIG. 4.
Figure 6:
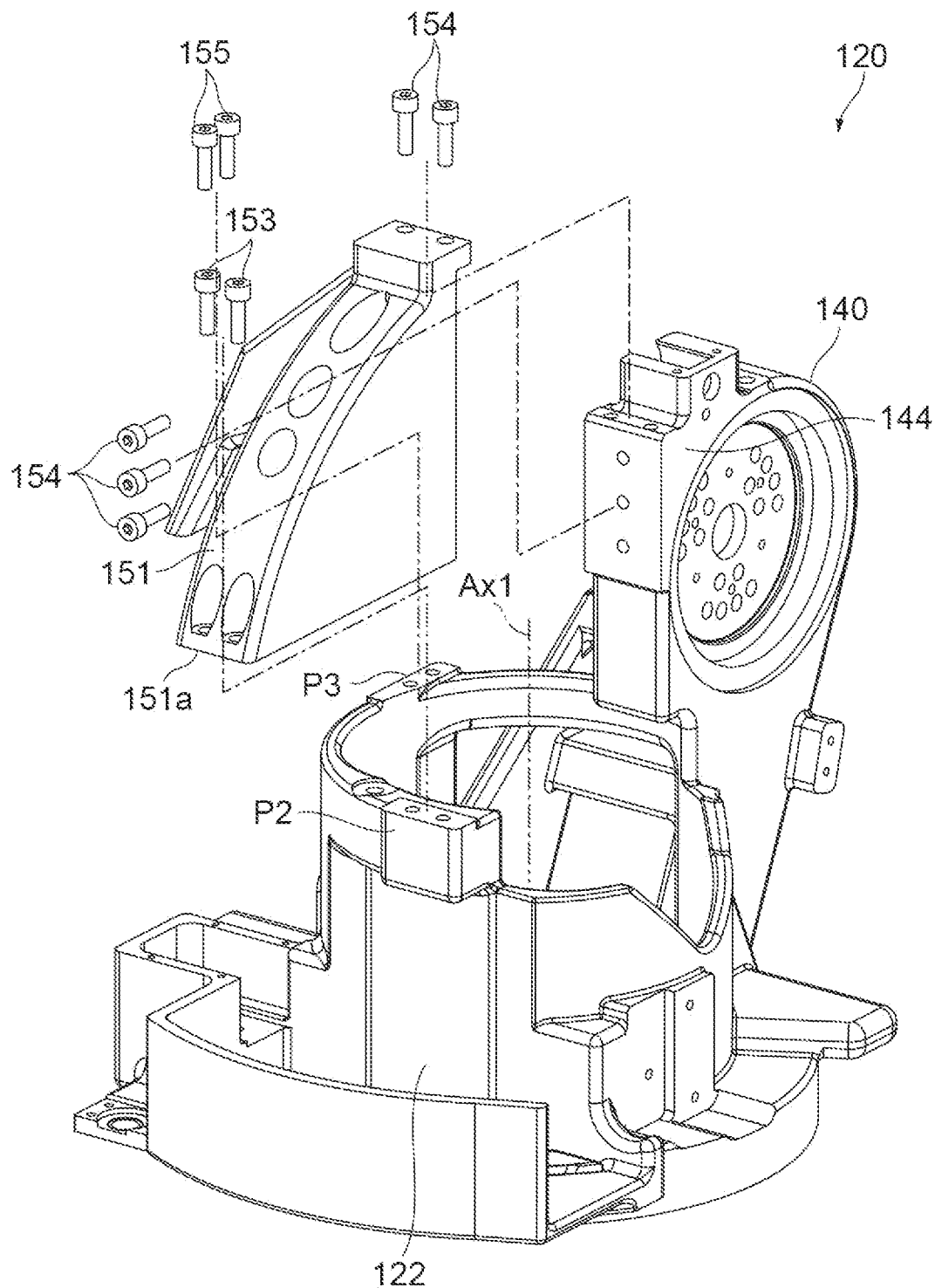
FIG. 6 is a perspective view illustrating a state in which the rib of the base unit is removed from a direction different from FIGS. 4 and 5.

As shown in FIGS. 4 to 6, the arm connector 140 is provided in (or located at) a first portion P1 of the rotating base 121 away from the actuator 130. For example, the first portion P1 is separated from the actuator 130 in one direction crossing (e.g., cross orthogonally) the axis Ax2 in a horizontal plane. Hereinafter, for convenience of description, the one direction is referred to as "front", and a direction opposite to the one direction is referred to as "rear".

For example, the first portion P1 is a portion of the circumference of the actuator housing 122 located in front of the actuator 130. The arm connector 140 is integrally formed with the rotating base 121 by, for example, a metal material, and protrudes upward from the first portion P1. The arm connector 140 has main surfaces 143 and 144 perpendicular to the axis Ax2. The main surfaces 143 and 144 are opposite to each other.

The arm 210 is connected to the arm connector 140 to swing around the axis Ax2. The arm 210 overlaps one side (e.g., the main surface 144 side) of the arm connector 140 along the axis Ax2. The actuator 251 is fixed to the main surface 143 side of the arm connector 140, and the arm 210 is connected to the arm connector 140 via the actuator 251.

The rib 151 (first rib) straddles the actuator 130 and connects the arm connector 140 to a second portion P2 of the rotating base 121. For example, the rib 151 partially surrounds the actuator 130 and connects the arm connector 140 to the second portion P1. The rib 151 may straddle the actuator 130 in a plane including the axis Ax1. The second portion P2 sandwiches the actuator 130 with the first portion P1, such that the actuator 130 is located between the first portion P1 and the second portion P2 of the rotating base 121. For example, the second portion P2 is a portion of a circumference of the actuator housing 122 located behind the actuator 130. The rib 151 is connected to a rear portion of the arm connector 140 and the second portion P2 of the rotating base 121 via vertically above the actuator 130. The rib 151 is provided outside the operation region MR of the arm 210 around the axis Ax2.

As shown in FIGS. 4 to 6, an undercut 151b is formed on a lower surface 151a of the rib 151 so as to be inclined or curved away from the actuator 130 toward the first portion P1 from the second portion P2. This reduces the weight of the rib 151. The undercut 151b does not necessarily have to be formed over the entire width of the rib 151. In the examples of FIGS. 4 to 6, the undercut 151b is not formed in a part of the rib 151 facing the operation region MR (hereinafter, referred to as an "outer part"). The outer portion protrudes downward from the undercut 151b.

Figure 3:
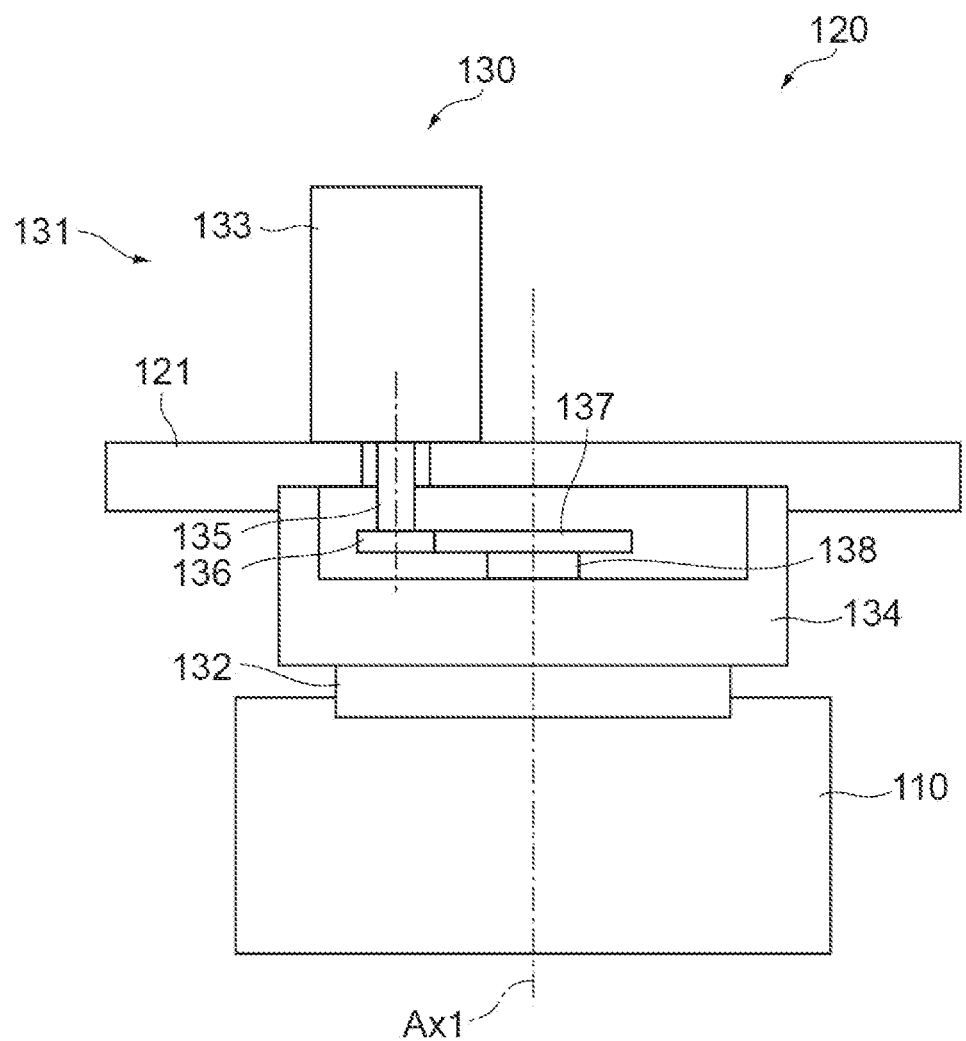
FIG. 3 is a schematic view illustrating a modification of the structure of the connection portion between the rotating base and the base.

When at least a part of the actuator 130 is located between the first portion P1 and the second portion P2, it can be said that the actuator 130 is sandwiched between the first portion P1 and the first portion P2, and the rib 151 is straddling the actuator 130. For example, as shown in FIG. 3, even when the body 131 is not vertically above the output shaft 132, at least the output shaft 132 is located between the first portion P1 and the second portion P2, so that the second portion P2 sandwiches the actuator 130 with the first portion P1, and the rib 151 is straddling the actuator 130. In the configuration of FIG. 3, the rotation of an output shaft 135 of the motor 133 is transmitted to an input shaft 138 of the speed reducer 134 via transmission elements 136 and 137 such as gears, and the output shaft 132 rotates according to the rotation of the input shaft 138.

The rib 151 may be detachable from the arm connector 140 and the rotating base 121. Detachable means that attachment and detachment can be repeated without destruction of the connection portion. For example, the rib 151 is a separate member from the rotating base 121, and the rotating unit 120 further includes one or more fastening members 153 (e.g., bolts or nuts) for removably attaching the rib 151 to the second portion P2 and one or more fastening members 154 (e.g., bolts or nuts) for removably attaching the rib 151 to the arm connector 140. The rib 151 increases the stiffness of the arm connector 140.

The rotating unit 120 may further comprise a rib 152 (second rib). The rib 152 is connected to the rotating base 121 and the rib 151 at a position where the rib 151 is sandwiched between the rib 152 and the operation region MR of the arm 210. The rib 152 is connected to a portion of a circumference of the actuator housing 122 (hereinafter, referred to as a "third portion P3"), and the rib 151. The third portion P3 and the operation region MR sandwiches the rib 151.

The rib 152 may be fixed to the rib 151 and may be detachable from the rotating base 121. For example, the rotating unit 120 comprises a rib unit 150 separated from the rotating base 121 and detachable from the rotating base 121, and the rib unit 150 includes the ribs 151 and 152. In addition to the fastening members 153 and 154 described above, the rotating unit 120 may further include one or more fastening members 155 (e.g., bolts or nuts) that removably fasten the rib 152 to the third portion P3. The rib 152 further increases the stiffness of the arm connector 140. As the undercut 151b is formed on the lower surface 151a of the rib 151, an undercut 152b is formed on the lower surface 152a of the rib 152 so as to be inclined or curved away from the actuator 130 toward the rib 151. This reduces the weight of the rib 152.

The rotating unit 120 may further include a rib 142 connected to the rotating base 121 and the arm connector 140 at a position sandwiching the actuator 251 with the rib 152. The rib 142 further increases the stiffness of the arm connector 140. The rib 142 may be curved to at least partially surround the actuator 251.

The rotating unit 120 may further include a cover 160 covering the rotating base 121 and the ribs 151 and 152 (see FIG. 1). The cover 160 may be made of a metal material or a resin material.

Figure 7:
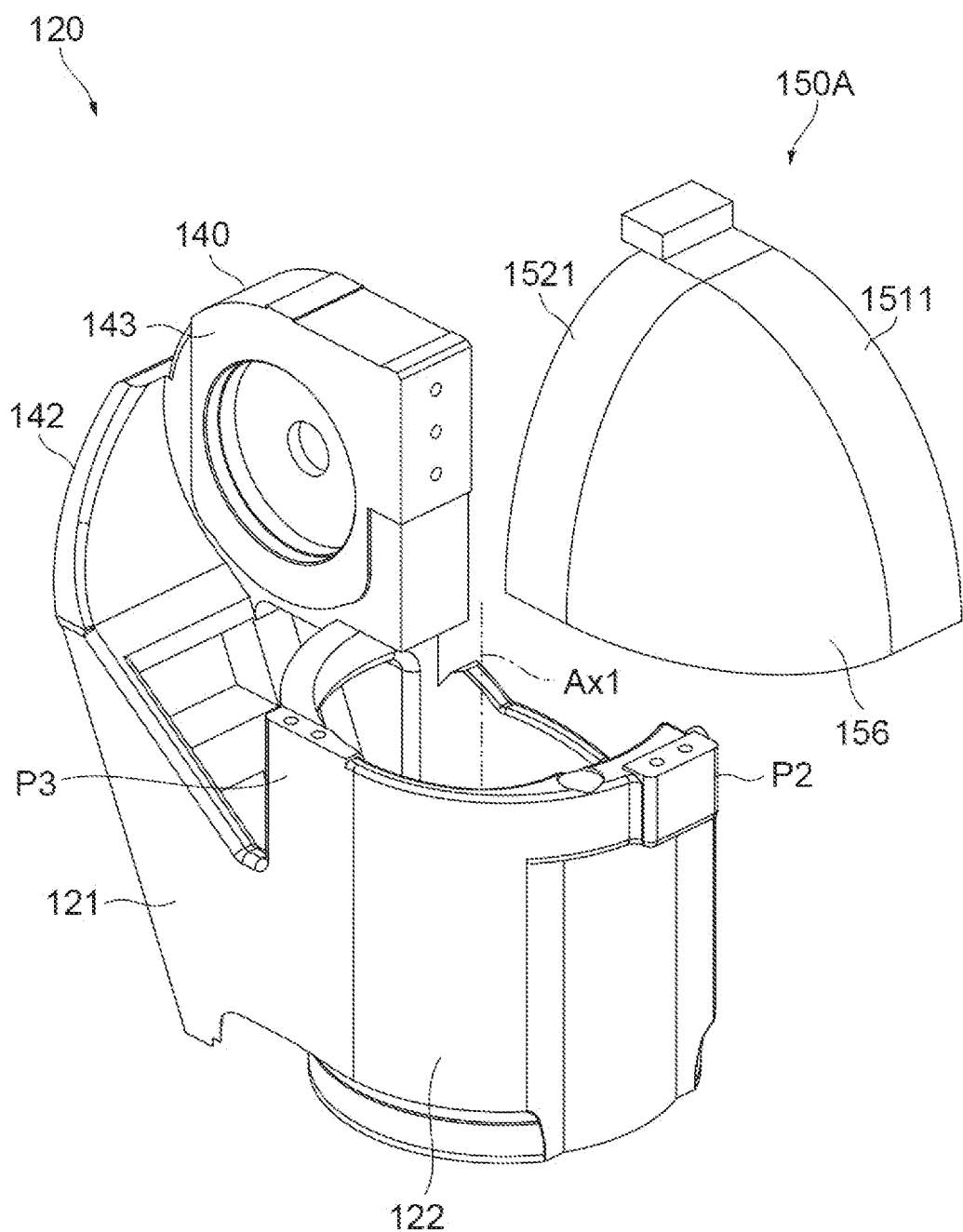
FIG. 7 is a perspective view illustrating a modification of the rib.
Figure 8:
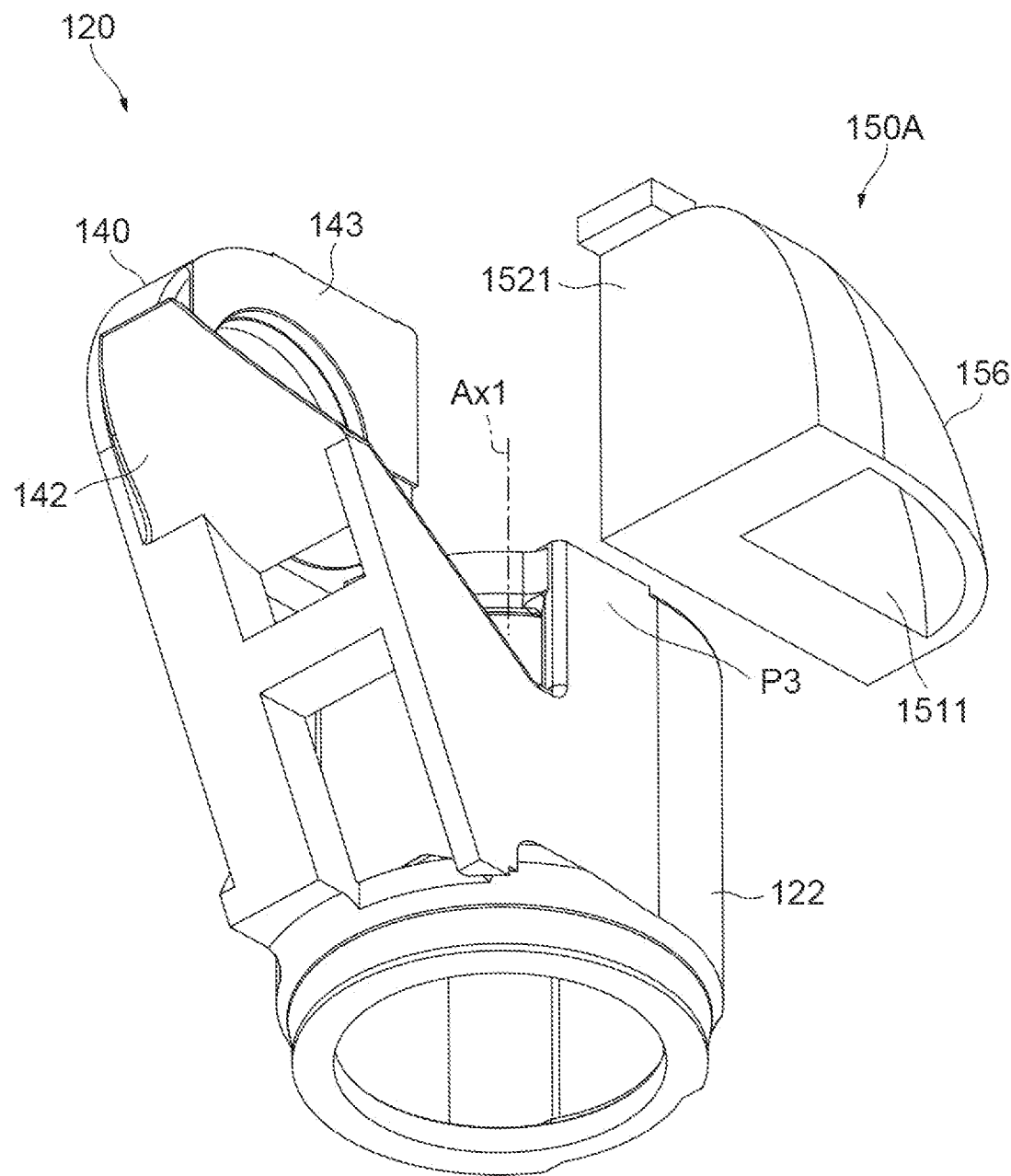
FIG. 8 is a perspective view illustrating a modification of the rib from a direction different from FIG. 7.
Figure 9:
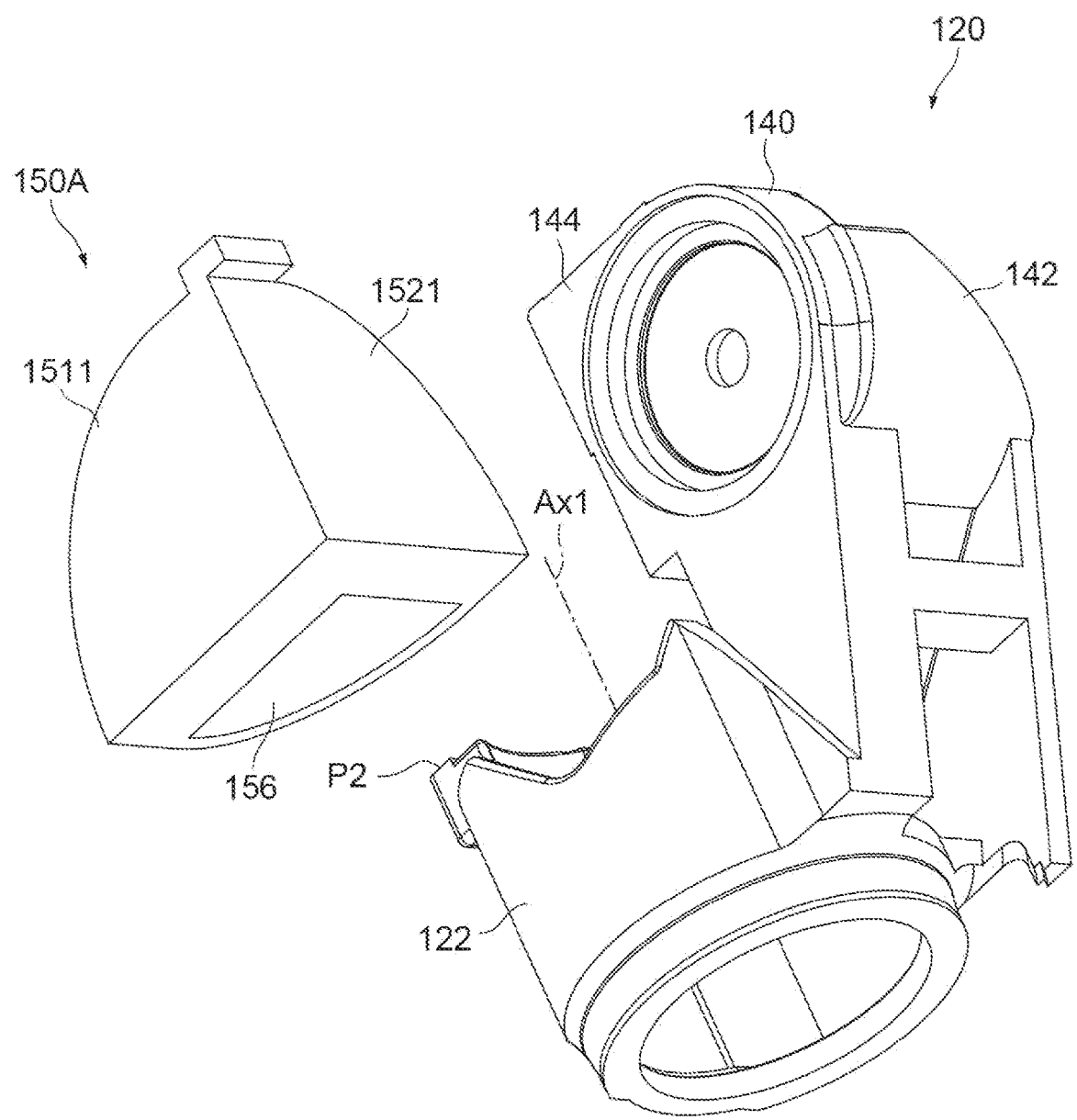
FIG. 9 is a perspective view illustrating a modification of the rib from a different direction from FIGS. 7 and 8.
Figure 10:
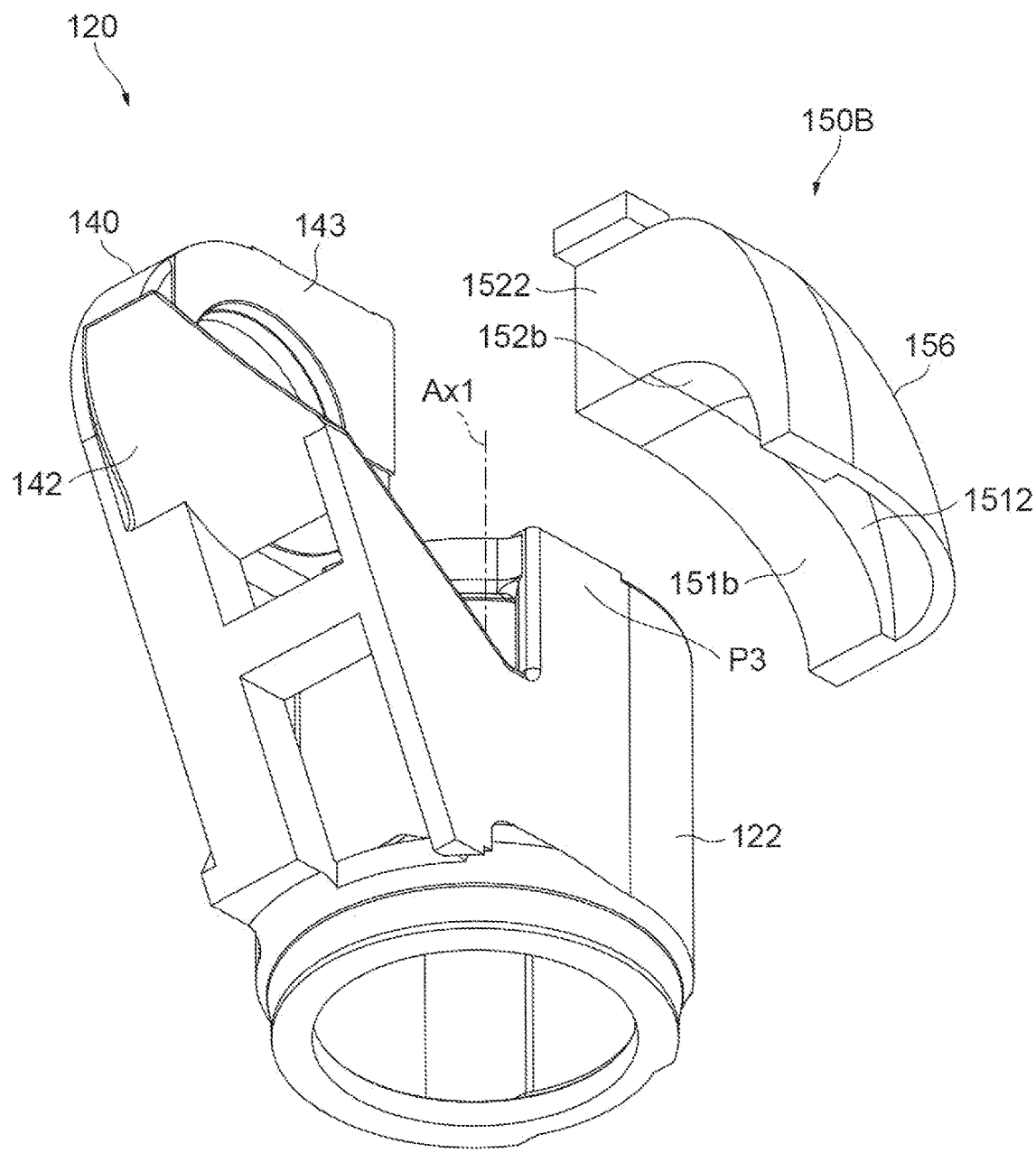
FIG. 10 is a perspective view illustrating another modification of the rib.
Figure 11:
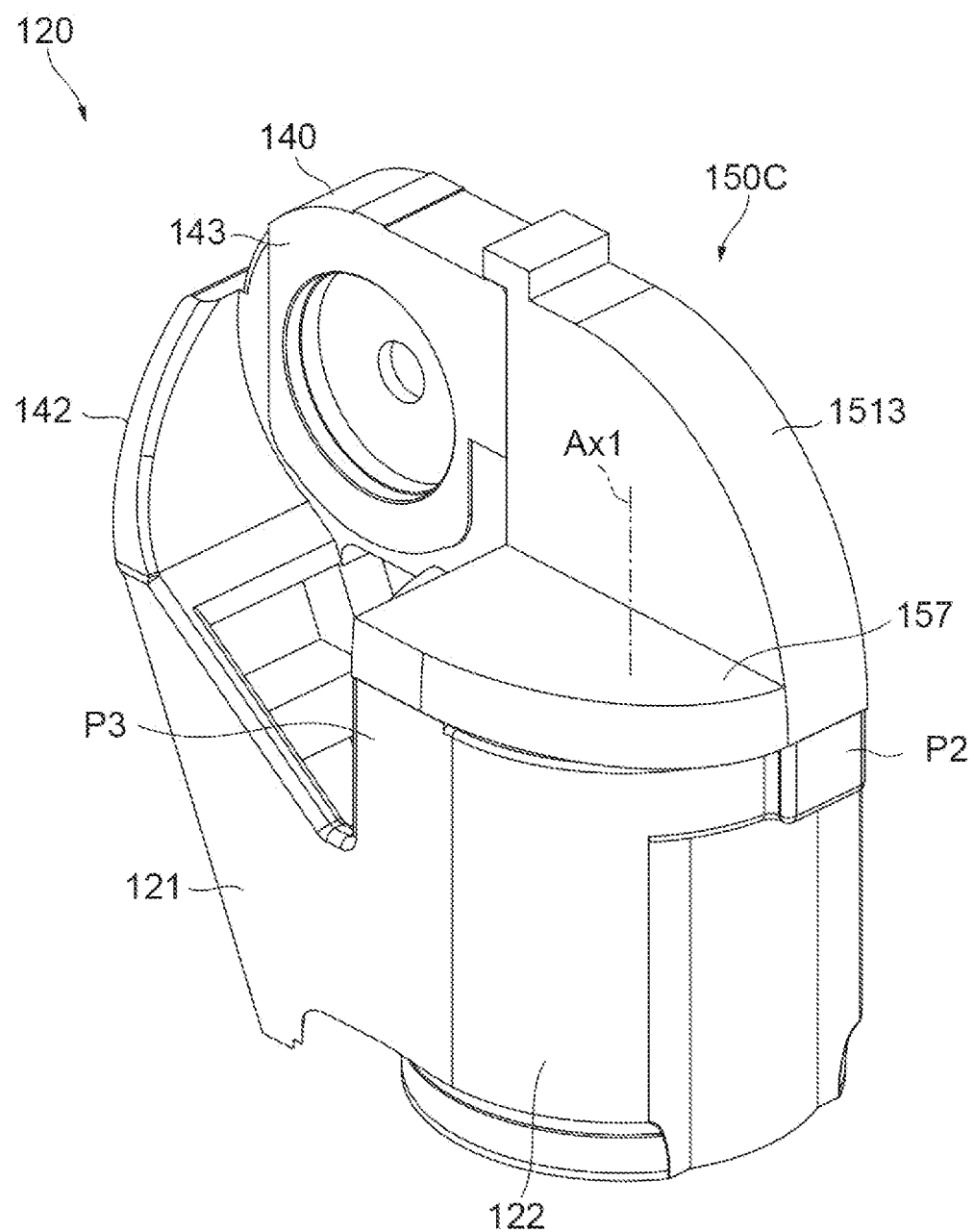
FIG. 11 is a perspective view illustrating another modification of the rib.
Figure 12:
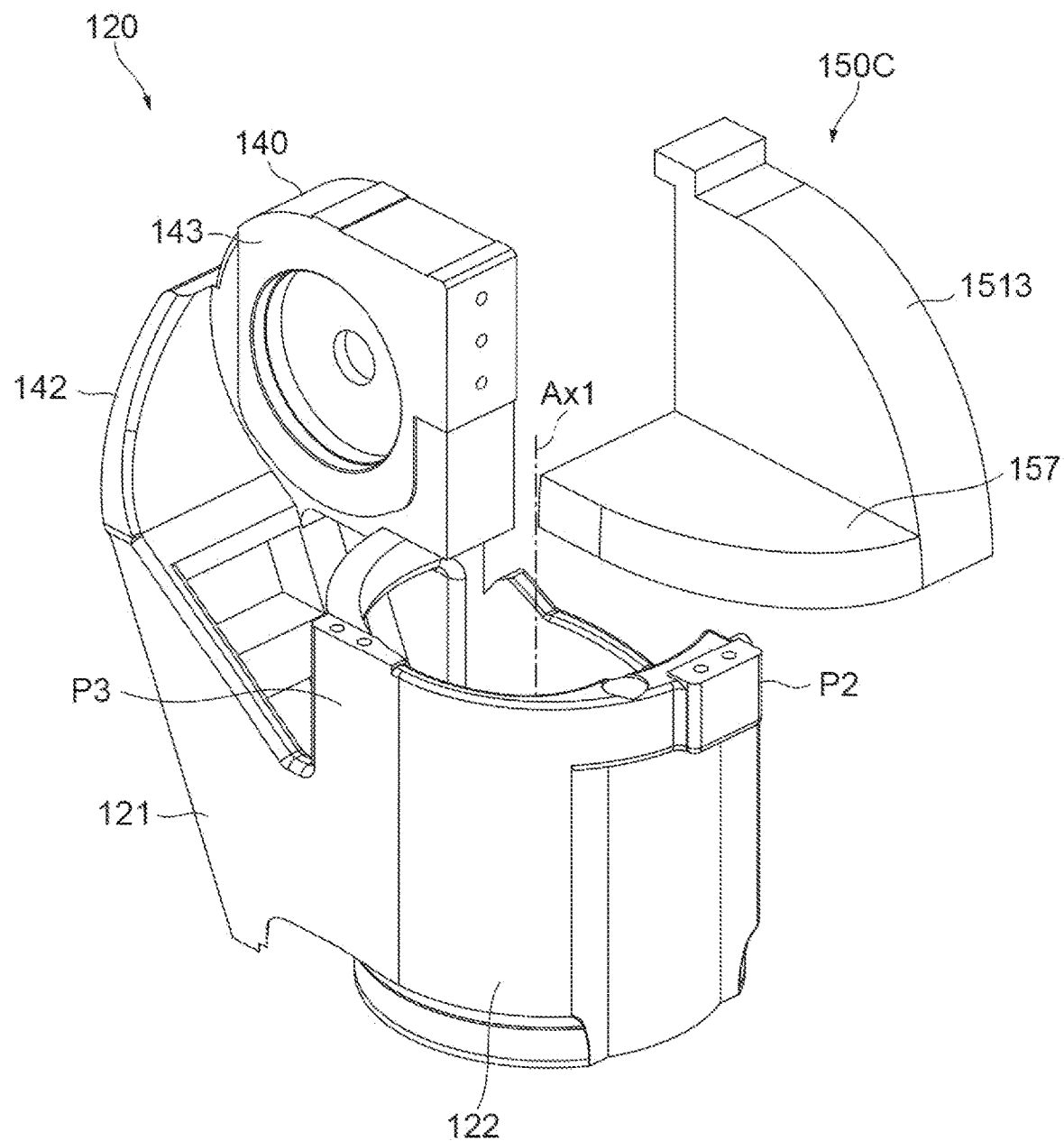
FIG. 12 is a perspective view of the rib of FIG. 11 removed from an actuator housing.
Figure 13:
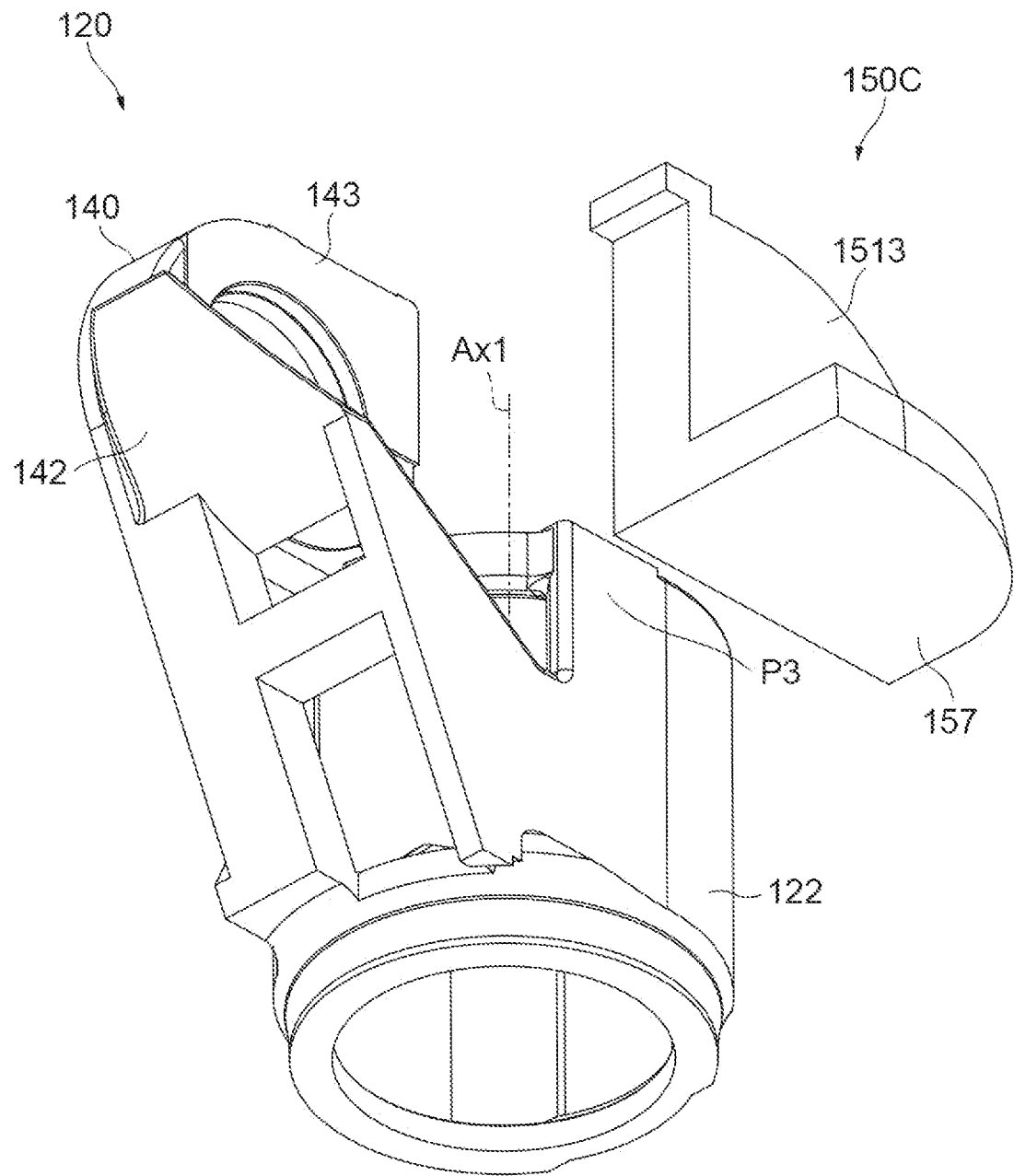
FIG. 13 is a perspective view illustrating the rib removed from the actuator housing from a direction different from FIG. 12.
Figure 14:
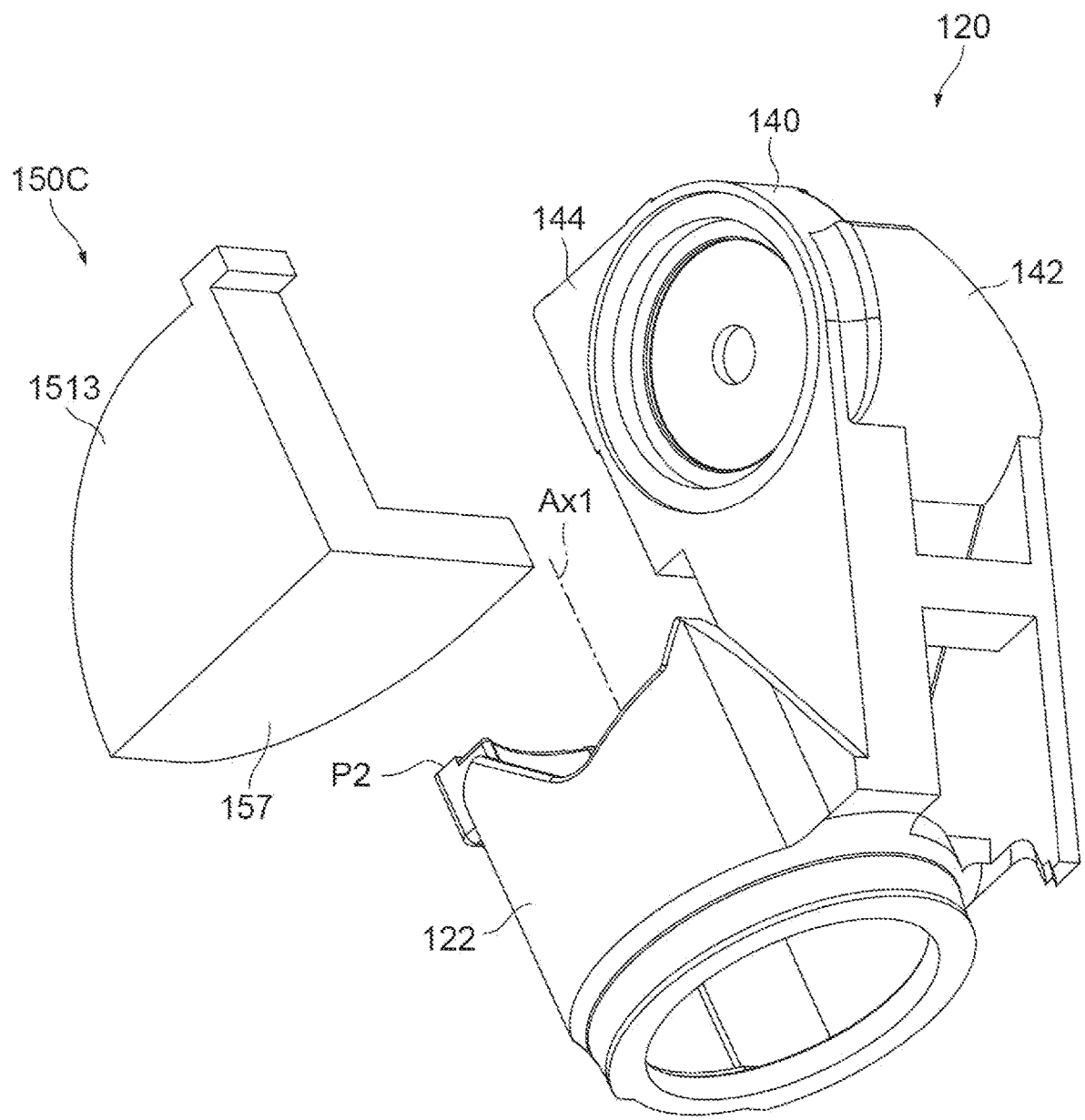
FIG. 14 is a perspective view illustrating the rib removed from the actuator housing from a direction different from FIGS. 12 and 13.

The configurations of the rib unit 150 shown in FIGS. 4 to 6 are merely examples, and can be changed variously. For example, a rib unit 150A shown in FIGS. 7 to 9 includes a rib 1511 corresponding to the rib 151, a rib 1521 corresponding to the rib 152, and a thin part 156 that covers an opening surrounded by the rib 1511, the rib 1521, and the periphery of the actuator housing 122. The thin part 156 is integrally formed with the rib 1511 and 1521. In the rib unit 150A, the undercut 151b is not formed in the rib 1511, and the undercut 152b is not formed in the rib 1521. A rib unit 150B shown in FIG. 10 is a modification of the rib unit 150A where the undercuts 151b and 152b are formed in the ribs 1512 and 1522, respectively. The rib 1512 corresponds to the rib 151. The rib 1522 corresponds to the rib 152. In a rib unit 150C shown in FIGS. 11 to 14, the rib 1513 corresponding to the rib 151 does not have the undercut 151b. The rib unit 150C does not have the rib 152. The rib unit 150C has a bracket 157 instead of the rib 152. The bracket 157 protrudes from a lower portion of the rib 1513 in a direction opposite to the operation region MR, and is connected to the periphery of the actuator housing 122. Although not shown in FIGS. 7 to 14, the rib units 150A, 150B, and 150C may also be removably fastened to the arm connector 140 and the rotating base 121 by one or more fastening members. For example, the bracket 157 is removably attached to the third portion P3 by one or more fastening members (not shown).

Arm

Next, structure of the arm 210 will be described in more detail. The arm 210 has a proximal portion 211, a tip portion 212, and an outer shell 213. The proximal portion 211 is made of, for example, a metal material, and is connected to the arm connector 140. The tip portion 212 is made of, for example, a metal material. The arm 220 is connected to the tip portion 212.

The outer shell 213 is a hollow portion extending along an axis crossing (e.g., cross orthogonally) the axes Ax2 and Ax3 and connecting the proximal portion 211 and the tip portion 212. The outer shell 213 includes a main body 214 having a plurality of openings and a cover 215 covering the main body 214. The main body 214 is integrally formed with the proximal portion 211 and the tip portion 212 by, for example, a metal material.

Figure 15:
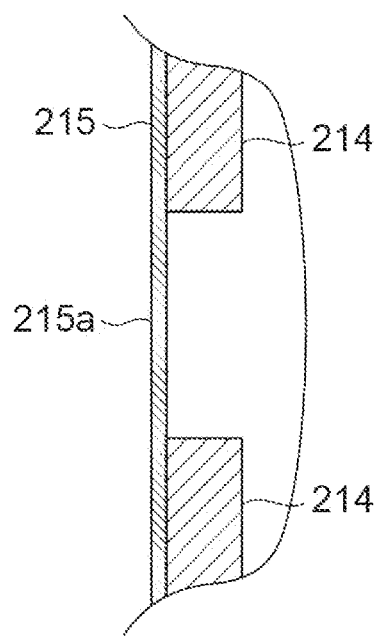
FIG. 15 is a partial cross-sectional view taken along line XV-XV in FIG. 1.
Figure 16:
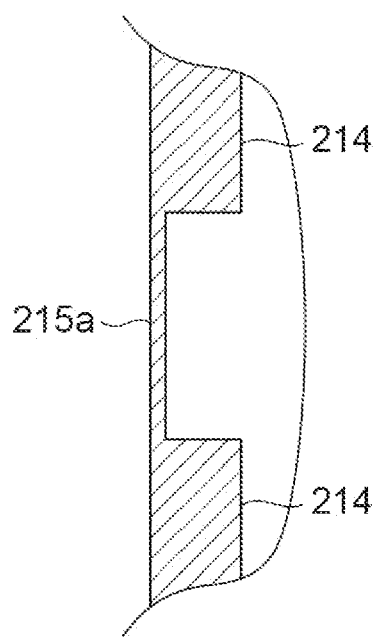
FIG. 16 is a view illustrating a modification of the structure of an outer shell.

The cover 215 may be made of a metal material or a resin material. As shown in FIG. 15, the cover 215 is thinner than the main body 214, and constitutes a plurality of thin parts 215a for covering the plurality of openings, respectively. As shown in FIG. 16, the thin parts 215a may be integrated with the main body 214.

Figure 17:
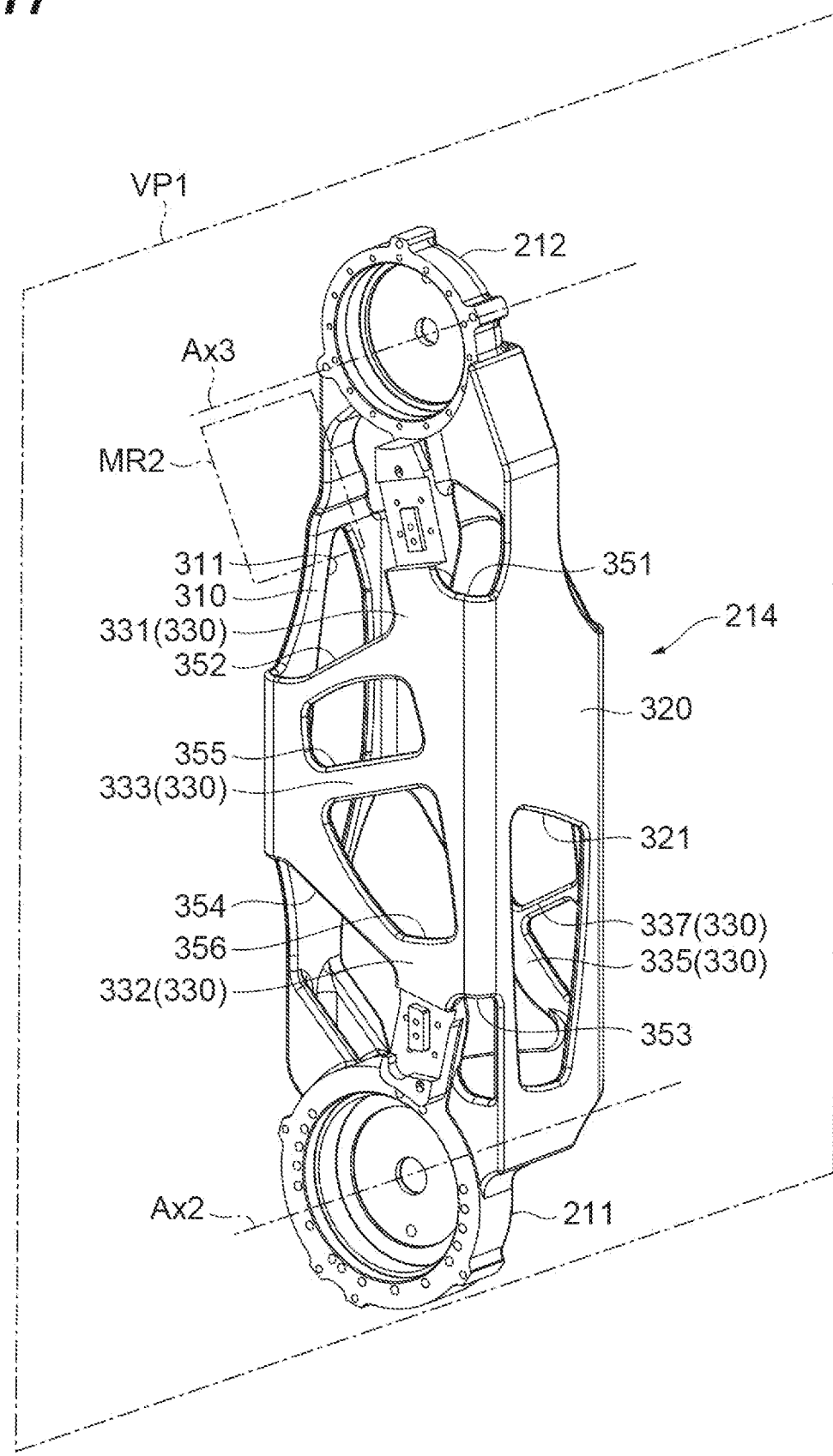
FIG. 17 is a perspective view of an arm.

As shown in FIG. 17, the main body 214 includes frames 310 and 320 and one or more connection frames 330. The frame 310 (first frame) and the frame 320 (second frame) face each other across a virtual plane VP1 including the axes Ax2 and Ax3, and connect the proximal portion 211 and the tip portion 212, respectively. With the tip portion 212 positioned vertically above the proximal portion 211, the frame 310 faces forward and the frame 320 faces rearward.

The aforementioned plurality of openings may include an opening 311 formed in the frame 310 and may include an opening 321 formed in the frame 320. The aforementioned plurality of openings may include both of the openings 311 and 321.

The one or more connection frames 330 connect the frame 310 and the frame 320 between the axis Ax2 and the axis Ax3. The one or more connection frames 330 may include a brace frame that is oblique to the frame 310 and the frame 320. The one or more connection frames 330 may include a proximal connection frame connected to the frame 310, the frame 320, and the proximal portion 211. The one or more connection frames 330 may include a tip connection frame connected to the frame 310, the frame 320, and the tip portion 212. The one or more connection frames 330 may include two connection frames that intersect each other.

The aforementioned plurality of openings may include an opening that is at least partially surrounded by the one or more connection frames 330. The main body 214 may be configured such that the connection frame 330 does not pass through a region overlapping the arm 220 and a region overlapping the arm connector 140.

Figure 18:
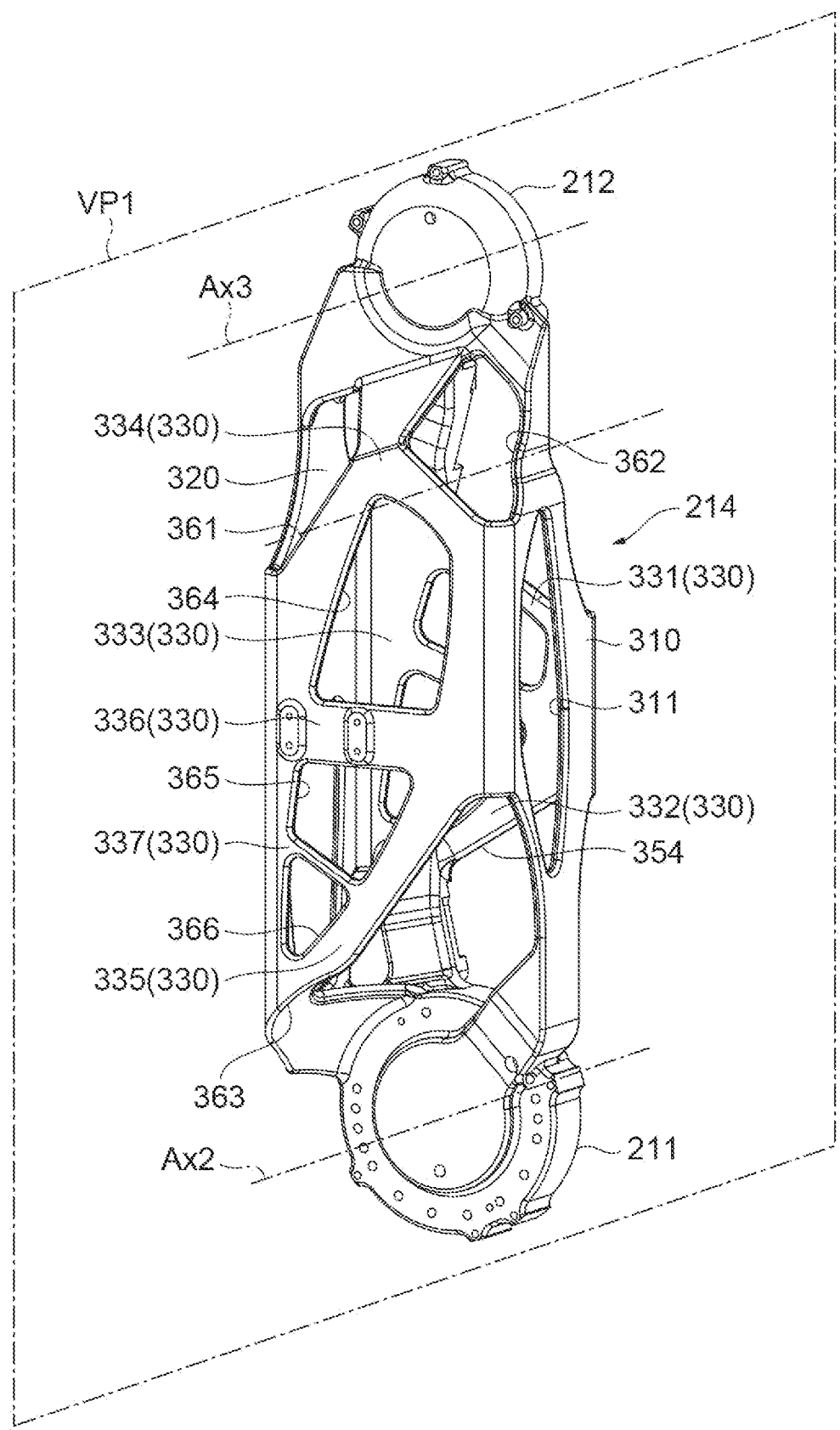
FIG. 18 is a perspective view of the arm from a direction different from FIG. 17
Figure 19:
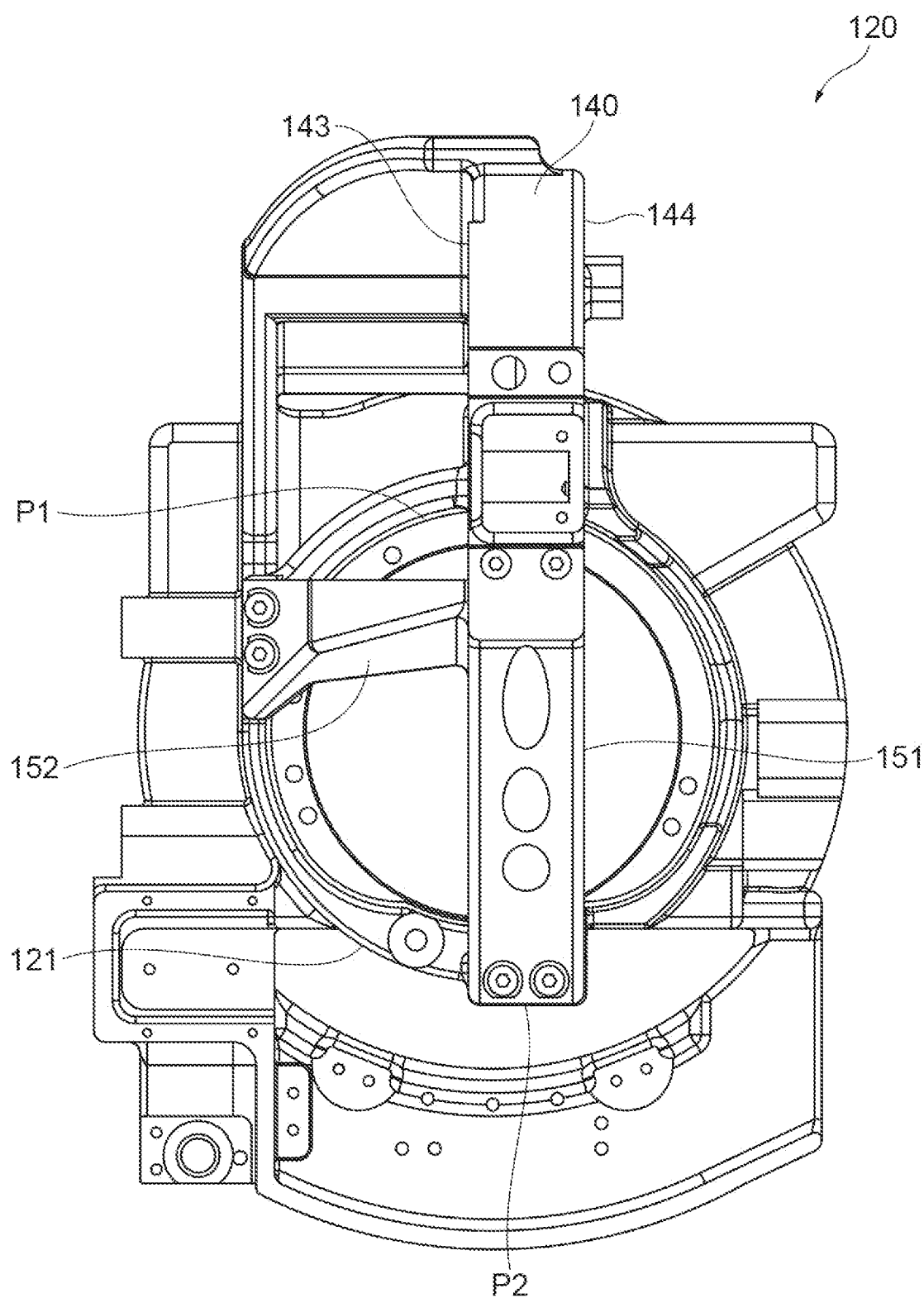
FIG. 19 is a plan view illustrating the rotating base and the base.

Hereinafter, an example configuration of the one or more connection frames 330 will be described in more detail. As shown in FIGS. 17 and 18, the main body 214 has a plurality of connection frames 331, 332, and 333 facing the arm connector 140 along the axis Ax2 and connection frames 334, 335, 336, and 337 facing away from the arm connector 140 along the axis Ax2.

A connection frame 331 is connected to the frame 310, the frame 320, and the tip portion 212. Therefore, the connection frame 331 corresponds to the tip connection frame. The connection frame 331 obliquely intersects the frame 310 and the frame 320. Therefore, the connection frame 331 also corresponds to the brace frame.

The connection frame 331 forms two openings 351 and 352. An opening 351 is surrounded by the tip portion 212, the frame 320, and the connection frame 331. An opening 352 is surrounded by the tip portion 212, the frame 310, and the connection frame 331. The connection portion between the connection frame 331 and the tip portion 212 is located closer to the frame 320 between the frame 310 and the frame 320. Thus, the opening 352 is larger than the opening 351. At least a portion of the opening 352 is located in a region MR2 of the arm 210 overlapping the arm 220. The connection frame 331 is inclined away from the axis Ax3 toward the frame 310 from the frame 320. This further increases the size of the opening 352, which contributes to a reduction in the weight of the arm 210 and ensures a large movable range of the arm 220 with respect to the arm 210.

A connection frame 332 is connected to the frame 310, the frame 320, and the proximal portion 211. Therefore, the connection frame 332 corresponds to the proximal connection frame. The connection frame 332 obliquely intersects the frame 310 and the frame 320. Therefore, the connection frame 332 also corresponds to the brace frame.

The connection frame 332 forms two openings 353 and 354. An opening 353 is surrounded by the proximal portion 211, the frame 320, and the connection frame 332. An opening 354 is surrounded by the proximal portion 211, the frame 310, and the connection frame 332. The connection portion between the connection frame 332 and the proximal portion 211 is located closer to the frame 320 between the frame 310 and the frame 320. Thus, the opening 354 is larger than the opening 353.

At least a portion of the opening 354 is located in a region of the arm 210 that overlaps the arm connector 140. The connection frame 332 is inclined away from the axis Ax2 toward the frame 310 from the frame 320. This further increases the size of the opening 354, which contributes to a reduction in the weight of the arm 210 and ensures a large movable range of the arm 210 with respect to the arm connector 140.

The connection frame 333 obliquely crosses the frame 310 and the frame 320 between the connection frame 331 and the connection frame 332. Therefore, the connection frame 333 corresponds to the brace frame. The connection frame 333 intersects the connection frame 332 in the vicinity of the frame 310.

The connection frame 333 further forms two openings 355 and 356. An opening 355 is surrounded by the connection frame 331, the frame 310, the connection frame 333, and the frame 320. An opening 356 is surrounded by the connection frame 332, the frame 310, the connection frame 333, and the frame 320.

A connection frame 334 is connected to the frame 310, the frame 320, and the tip portion 212. Therefore, the connection frame 334 corresponds to the tip connection frame. The connection frame 334 is bent to protrude toward the tip portion 212 and connected to the tip portion 212. The connection frame 334 forms two openings 361 and 362. An opening 361 is surrounded by the tip portion 212, the frame 320, and the connection frame 334. An opening 362 is surrounded by the tip portion 212, the frame 310, and the connection frame 334.

The connection frame 335 is located closest to the proximal portion 211 among the connection frames 334, 335, 336, and 337. The connection frame 335 obliquely intersects the frame 310 and the frame 320. Therefore, the connection frame 335 corresponds to the brace frame.

Since the connection frame 335 is not connected to the proximal portion 211, one opening 363 is formed between the connection frame 335 and the proximal portion 211. The opening 363 is surrounded by the proximal portion 211, the frame 320, the connection frame 335, and the frame 310. The opening 363 can be used for cable wiring and the like.

The connection frame 336 obliquely crosses the frame 310 and the frame 320 between the connection frame 334 and the connection frame 335. Therefore, the connection frame 336 corresponds to the brace frame. The connection frame 336 intersects the connection frame 334 in the vicinity of the frame 320, and intersects the connection frame 335 in the vicinity of the frame 310.

The connection frame 337 is located between the connection frame 335 and the connection frame 336. One end of the connection frame 337 is connected to the frame 320. The other end of the connection frame 337 is connected to the connection frame 335 and is connected to the frame 310 via the connection frame 335.

The connection frames 336 and 337 form three openings 364, 365, and 366. An opening 364 is surrounded by the connection frame 334, the connection frame 336, and the frame 310. An opening 365 is surrounded by the connection frame 336, the frame 320, the connection frame 337, and the connection frame 335. An opening 366 is surrounded by the connection frame 337, the frame 320, and the connection frame 335.

As described above, the robot 1 includes the base unit 100 and the articulated arm 200. The base unit 100 includes the rotating base 121, the actuator 130 provided on the rotating base 121 to rotate the rotating base 121 about the axis Ax1, and the arm connector 140 provided on the first portion P1 of the rotating base 121 away from the actuator 130. The articulated arm 200 has the arm 210 connected to the arm connector 140 to swing about the axis Ax2. The base unit 100 further comprises the rib 151 that connects the arm connector 140 and the second portion P2 of the rotating base 121 straddling the actuator 130.

To downsize the base unit 100 of the robot 1, the arm connector 140 and the actuator 130 need to be brought into close proximity. However, downsizing the arm connector 140 due to its proximity to the actuator 130 reduces stiffness. In contrast, in the robot 1, the base unit 100 further includes the rib 151, and the rib 151 strides the actuator 130 to connect the arm connector 140 and the rotating base 121. With this structure, the arm connector 140 and the actuator 130 may be brought close to each other while maintaining the stiffness of the arm connector 140, thereby downsizing the base unit 100. Therefore, downsizing may be achieved.

The rib 151 may be detachable from the arm connector 140 and the rotating base 121. In this case, both downsizing and maintainability may be achieved.

The axis Ax2 may cross the axis Ax1, the arm 210 may overlap one side of the arm connector 140 along the axis Ax2, and the rib 151 may be provided outside an operation region of the arm 210 around the axis Ax2. In some examples, the arm 210 may occupy the operation region while swinging about the axis Ax2, and the rib 151 may be located adjacent to the operation region of the arm 210. In this case, both the wide movable range of the arm 210 and the stiffness of the arm connector 140 may be achieved.

The robot 1 may further include the rib 152 connected to the rotating base 121 and the rib 151 at a position at which the rib 151 is interposed between the rib 152 and the operation region MR of the arm 210. In this case, the stiffness of the arm connector 140 may be further improved while maintaining a wide movable region of the arm 210.

The rib 152 may be fixed to the rib 151 and may be detachable from the rotating base 121. The rib 152 may be removably connected to the rotating base 121. In this case, both downsizing and maintainability may be achieved.

The arm 210 may have the proximal portion 211 connected to the arm connector 140, the tip portion 212, and the hollow outer shell 213. The outer shell 213 may connect the proximal portion 211 and the tip portion 212. The outer shell 213 may include the main body 214 having a plurality of openings and the thin parts 215a covering the openings, respectively. In this case, the weight of the arm 210 may be reduced while maintaining the stiffness of the arm 210. Further, the reduction in weight of the arm 210 may enable further downsizing of the base unit 100. Therefore, further downsizing may be achieved.

The articulated arm 200 further may have the arm 220 connected to the tip portion 212 to swing about the axis Ax3 parallel to the axis Ax2, and the main body 214 may include the frame 310, the frame 320, and the one or more connection frames 330. The frame 310 and the frame 320 face each other across a virtual plane VP1 including the axis Ax2 and the axis Ax3, and connect the tip portion 212 and the proximal portion 211, respectively. The one or more connection frames 330 connect the frame 310 and the frame 320 between the axis Ax2 and the axis Ax3. In this case, the stiffness of the arm 210 in the swing direction around the axis Ax2 may be freely adjusted by the number and arrangement of the one or more connection frames 330.

The one or more connection frames 330 may include the frames 331, 332, 333, 335, and 336 (the brace frame) that is oblique to the frame 310 and the frame 320. In this case, the stiffness of the arm 210 in the swing direction around the axis Ax2 may be improved.

The one or more connection frames 330 may include the connection frame 332 (proximal connection frame) connected to the frame 310, the frame 320, and the proximal portion 211. In this case, the stiffness of the arm 210 at the tip portion 212 where the moment of the arm 210 is concentrated may be improved.

The one or more connection frames 330 may include the connection frames 331 and 334 (tip connection frame) connected to the frame 310, the frame 320, and the tip portion 212. In this case, the stiffness of the arm 220 at the tip portion 212 where the moment of the arm 210 is concentrated may be improved.

The one or more connection frames 330 may include two connection frames 330 that intersect each other. In this case, the stiffness of the arm 210 in the swing direction around the axis Ax2 may be further improved.

The main body 214 may be configured such that the connection frame 330 does not pass through a region overlapping the arm 220 and a region overlapping the arm connector 140. In this case, both the wide movable range of the arm 210 and the stiffness of the arm 210 may be achieved.

The plurality of openings may include the opening 311 formed in the frame 310 and may include the opening 312 formed in the frame 320. In this case, further weight reduction may be achieved.

It is to be understood that not all aspects, advantages and features described herein may necessarily be achieved by, or included in, any one particular example embodiment. Indeed, having described and illustrated various examples herein, it should be apparent that other examples may be modified in arrangement and detail. We claim all modifications and variations coming within the spirit and scope of the subject matter claimed herein.

Regarding the above embodiments, the following appendices are appended.

(Appendix 1) A robot comprising:
an articulated arm; and
a base unit to which the articulated arm is operably coupled, the base unit comprising:
a rotating portion;
an actuator mounted on the rotating portion and configured to rotate the rotating portion about a first axis;
an arm connector located at a first portion of the rotating portion, wherein the articulated arm is connected to the arm connector to swing about a second axis; and
a rib straddling the actuator and connecting the arm connector to a second portion of the rotating portion, wherein the actuator is located between the first portion and the second portion of the rotating portion.

(Appendix 2) The robot according to appendix 1, wherein the rib is removably connected to the arm connector and the rotating portion.

(Appendix 3) The robot according to appendix 1 or 2, wherein the second axis crosses the first axis,
wherein the articulated arm occupies an operation region while swinging about the second axis, and
wherein the rib is located adjacent to the operation region of the articulated arm.

(Appendix 4) The robot according to appendix 3, further comprising a second rib connecting the rib to the rotating portion, wherein the rib is located between the second rib and the operation region of the articulated arm.

(Appendix 5) The robot according to appendix 4, wherein the second rib is removably connected to the rotating portion.

(Appendix 6) The robot according to any one of appendices 1 to 5, wherein the rib straddles the actuator in a plane including the first axis.

(Appendix 7) The robot according to appendix 6, wherein the base unit further comprises a base,
wherein the actuator rotates the rotating portion about the first axis with respect to the base, and
wherein at least a part of the actuator is located between the rib and the base.

(Appendix 8) The robot according to appendix 7, wherein the actuator comprises:
an output shaft connected to the base; and
a main body configured to rotate the output shaft around the first axis, and
wherein the output shaft is located between the rib and the base.

(Appendix 9) The robot according to appendix 8, wherein both the main body and the output shaft are located between the base and the rib.

(Appendix 10) The robot according to appendix 8, wherein the main body comprises:
a motor configured to generate power; and
a transmitter configured to transmit the power to the output shaft, and
wherein the output shaft is located between the base and the rib, and the motor is not located between the base and the rib.

(Appendix 11) The robot according to any one of appendices 1 to 10, wherein the articulated arm comprises:

a first arm connected to the arm connector to swing about the second axis; and a second arm connected to a tip portion of the first arm so as to swing around a third axis substantially parallel to the second axis.

(Appendix 12) The robot according to any one of appendices 1 to 10, wherein the articulated arm comprises a first arm including:
- a proximal portion connected to the arm connector;
- a tip portion; and
- a hollow outer shell connecting the proximal portion to the tip portion, and
- wherein the outer shell comprises:
- a plurality of recesses; and
- a plurality of frames each of which at least partially surrounds one of the plurality of recesses.

(Appendix 13) The robot according to appendix 12 wherein the articulated arm further comprises a second arm connected to the tip portion of the first arm to swing about a third axis substantially parallel to the second axis, and
- wherein the plurality of frames includes:
- a first frame and a second frame facing each other across a virtual plane including the second axis and the third axis, wherein each of the first frame and the second frame connects the tip portion to the proximal portion; and
- one or more connection frames connecting the first frame to the second frame between the second axis and the third axis.

(Appendix 14) The robot according to appendix 13, wherein at least one of the connection frames is oblique to the virtual plane.

(Appendix 15) The robot according to appendix 13 or 14, wherein at least one of the connection frames is connected to the first frame, the second frame, and the proximal portion.

(Appendix 16) The robot according to any one of appendices 13 to 15, wherein at least one of the connection frames is connected to the first frame, the second frame, and the tip portion.

(Appendix 17) The robot according to any one of appendices 13 to 16, wherein the one or more connection frames include two connection frames connected to each other.

(Appendix 18) The robot according to any one of appendices 13 to 17, wherein the second arm occupies a first region adjacent to the first arm while swinging about the third axis,
wherein the arm connector occupies a second region adjacent to the first arm while the first arm swings about the second axis, and
wherein each of the one or more connection frames is located outside of the first region and the second region.

(Appendix 19) The robot according to any one of appendices 13 to 18, wherein at least one of the plurality of recesses is formed in the first frame.

(Appendix 20) The robot according to appendix 19, wherein at least one of the plurality of recesses is formed in the second frame.

What is claimed is:

1. A robot comprising:
an articulated arm; and
a base unit to which the articulated arm is operably coupled, the base unit comprising:
a base;
a rotating portion;
an actuator mounted on the rotating portion and configured to rotate the rotating portion about a first axis with respect to the base;
an arm connector located at a first portion of the rotating portion, wherein the articulated arm is connected to the arm connector to swing about a second axis; and
a rib straddling the actuator so as to intersect with the first axis, and connecting the arm connector to a second portion of the rotating portion, wherein the actuator is located between the first portion and the second portion of the rotating portion,
wherein the actuator comprises:
an output shaft positioned on the first axis and connected to the base; and
a motor positioned on the first axis and configured to rotate the output shaft around the first axis, and
wherein both the motor and the output shaft are located between the base and the rib along the first axis that intersects with the rib.

2. The robot according to claim 1, wherein the rib is removably connected to the arm connector and the rotating portion.

3. The robot according to claim 1, wherein the articulated arm comprises:
a first arm connected to the arm connector to swing about the second axis; and
a second arm connected to a tip portion of the first arm so as to swing around a third axis substantially parallel to the second axis.

4. The robot according to claim 1, wherein the actuator further comprises a transmitter configured to transmit power generated by the motor to the output shaft.

5. The robot according to claim 1, wherein the second axis crosses the first axis,
wherein the articulated arm occupies an operation region while swinging about the second axis, and
wherein the rib is located adjacent to the operation region of the articulated arm.

6. The robot according to claim 5, wherein the rib is located adjacent to the operation region along a direction substantially parallel to the second axis.

7. The robot according to claim 5, further comprising a second rib connecting the rib to the rotating portion, wherein the rib is located between the second rib and the operation region of the articulated arm.

8. The robot according to claim 7, wherein the second rib is removably connected to the rotating portion.

9. The robot according to claim 7, wherein the rib is located between the second rib and the operation region along a direction substantially parallel to the second axis.

10. The robot according to claim 7, wherein the rib is removably connected to the arm connector and the rotating portion, and
wherein the second rib is removably connected to the rotating portion.

11. The robot according to claim 10, wherein the second rib is integrally formed with the rib.

12. The robot according to claim 1, wherein the articulated arm comprises a first arm including:
a proximal portion connected to the arm connector;
a tip portion; and
a hollow outer shell connecting the proximal portion to the tip portion, and
wherein the outer shell comprises:
a plurality of recesses; and a plurality of frames each of which at least partially surrounds one of the plurality of recesses.

13. The robot according to claim 12, wherein the articulated arm further comprises a second arm connected to the tip portion of the first arm to swing about a third axis substantially parallel to the second axis, and wherein the plurality of frames includes:

a first frame and a second frame facing each other across a virtual plane including the second axis and the third axis, wherein each of the first frame and the second frame connects the tip portion to the proximal portion; and one or more connection frames connecting the first frame to the second frame between the second axis and the third axis.

14. The robot according to claim 13, wherein at least one of the connection frames is oblique to the virtual plane.

15. The robot according to claim 13, wherein at least one of the connection frames is connected to the first frame, the second frame, and the proximal portion.

16. The robot according to claim 13, wherein at least one of the connection frames is connected to the first frame, the second frame, and the tip portion.

17. The robot according to claim 13, wherein the one or more connection frames include two connection frames connected to each other.

18. The robot according to claim 13, wherein the second arm occupies a first region adjacent to the first arm while swinging about the third axis, wherein the arm connector occupies a second region adjacent to the first arm while the first arm swings about the second axis, and wherein each of the one or more connection frames is located outside of the first region and the second region.

19. The robot according to claim 13, wherein at least one of the plurality of recesses is formed in the first frame.

20. The robot according to claim 19, wherein at least one of the plurality of recesses is formed in the second frame.

* * * * *